US012281771B2

(12) United States Patent
Kobayashi

(10) Patent No.: US 12,281,771 B2
(45) Date of Patent: Apr. 22, 2025

(54) LAMP FOR DRAWING

(71) Applicant: KOITO MANUFACTURING CO., LTD., Tokyo (JP)

(72) Inventor: Norihiko Kobayashi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 18/575,666

(22) PCT Filed: Aug. 9, 2022

(86) PCT No.: PCT/JP2022/030408
§ 371 (c)(1),
(2) Date: Dec. 29, 2023

(87) PCT Pub. No.: WO2023/022069
PCT Pub. Date: Feb. 23, 2023

(65) Prior Publication Data

US 2024/0337360 A1 Oct. 10, 2024

(30) Foreign Application Priority Data

Aug. 20, 2021 (JP) ................................ 2021-134923

(51) Int. Cl.
*F21S 41/43* (2018.01)
*F21S 41/143* (2018.01)
(Continued)

(52) U.S. Cl.
CPC ............ *F21S 41/43* (2018.01); *F21S 41/143* (2018.01); *F21S 41/255* (2018.01);
(Continued)

(58) Field of Classification Search
CPC ........ F21S 41/43; F21S 41/143; F21S 41/255; F21W 2103/60; F21Y 2101/00; F21Y 2115/10
See application file for complete search history.

(56) References Cited

U.S. PATENT DOCUMENTS

| | | | |
|---|---|---|---|
| 2010/0226144 A1 | 9/2010 | Stade et al. | |
| 2013/0063951 A1 | 3/2013 | Beier et al. | |

(Continued)

FOREIGN PATENT DOCUMENTS

| | | |
|---|---|---|
| JP | 2014-189198 A | 10/2014 |
| JP | 2021-512466 A | 5/2021 |
| WO | 2017/164328 A1 | 9/2017 |

OTHER PUBLICATIONS

International Search Report dated Sep. 27, 2022 filed in PCT/JP2022/030408.

*Primary Examiner* — Elmito Breval
(74) *Attorney, Agent, or Firm* — Rankin, Hill & Clark LLP

(57) ABSTRACT

A light shielding plate for shielding part of light from a light emitting element to a projection lens is arranged between the light emitting element and the projection lens, and an opening penetrating the light shielding plate is formed in a required region of the light shielding plate. With this configuration, the drawing light distribution pattern can be formed as a light distribution pattern corresponding to the opening shape of the opening. In this configuration, the inner peripheral surface of the opening has such a surface shape that light emitted from the light emitting center of the light emitting element does not enter the projection lens. Thus, even if the plate thickness of the light shielding plate is increased, occurrence of color unevenness in an outline
(Continued)

portion of the drawing light distribution pattern due to light reflection on the inner peripheral surface of the opening is effectively reduced.

4 Claims, 13 Drawing Sheets

(51) Int. Cl.

| | |
|---|---|
| ***F21S 41/255*** | (2018.01) |
| *F21W 103/60* | (2018.01) |
| *F21Y 101/00* | (2016.01) |
| *F21Y 115/10* | (2016.01) |

(52) U.S. Cl.
CPC ...... *F21W 2103/60* (2018.01); *F21Y 2101/00* (2013.01); *F21Y 2115/10* (2016.08)

(56) References Cited

U.S. PATENT DOCUMENTS

2019/0113197 A1 4/2019 Kamiya et al.
2021/0003263 A1 1/2021 Taudt et al.

LAMP FOR DRAWING

TECHNICAL FIELD

The invention of the present application relates to a drawing lamp configured to form a drawing light distribution pattern.

BACKGROUND ART

Conventionally, as a drawing lamp for forming a drawing light distribution pattern (i.e., light distribution pattern for drawing a character, a symbol, or the like on, e.g., a lamp front road surface), there has been known a lamp configured to emit light from a light emitting element to the lamp front through a projection lens.

"Patent Literature 1" describes, as an in-vehicle drawing lamp, a lamp configured to form a drawing light distribution pattern on a lamp front road surface together with a low beam light distribution pattern.

The drawing lamp described in "Patent Literature 1" has such a configuration that a light shielding plate for shielding part of light from a light emitting element to a projection lens is arranged between the light emitting element and the projection lens, and forms the drawing light distribution pattern corresponding to the opening shape of an opening formed in the light shielding plate.

CITATION LIST

Patent Literature

Patent Literature 1: JP-A-2014-189198

SUMMARY OF INVENTION

Problems to be Solved by Invention

By forming the drawing light distribution pattern by light emitted from such an in-vehicle drawing lamp, it is possible to indicate own vehicle's intention to surroundings, e.g., during traveling of a vehicle at night, and therefore, it is possible to warn other vehicles, pedestrians, and the like.

In order to sufficiently ensure a function of warning the surroundings, it is desirable to form a clear drawing light distribution pattern. Thus, it is important to reduce blurring of the outline shape of the drawing light distribution pattern and occurrence of color unevenness in the outline portion.

In addition, in order to form the clear drawing light distribution pattern, it is necessary to prevent the opening shape of the opening from being easily deformed as the configuration of the light shielding plate, and for this purpose, it is necessary to ensure a plate thickness of a certain value or more. In a case where the plate thickness of the light shielding plate is increased, the ratio of light reflected on the inner peripheral surface of the light shielding plate in light emitted from the light emitting element increases, and therefore, the outline shape of the drawing light distribution pattern is likely to be blurred or color unevenness is likely to occur in the outline portion due to the reflected light.

Note that it is desirable to form a clear drawing light distribution pattern also in a drawing lamp other than an in-vehicle lamp.

The invention of the present application has been made in view of such circumstances, and an object thereof is to provide a drawing lamp capable of forming a clear drawing light distribution pattern in a drawing lamp configured to form a drawing light distribution pattern.

Solution to Problems

The invention of the present application aims to achieve the above-described object by devising the configuration of a light shielding plate.

That is, a drawing lamp according to the invention of the present application is a drawing lamp configured to form a drawing light distribution pattern by emitting light from a light emitting element to a lamp front through a projection lens, in which a light shielding plate for shielding part of light from the light emitting element to the projection lens is arranged between the light emitting element and the projection lens, an opening penetrating the light shielding plate is formed in a required region of the light shielding plate, and an inner peripheral surface of the opening has such a surface shape that light emitted from the light emitting center of the light emitting element does not enter the projection lens.

The "drawing lamp" may be an in-vehicle lamp or a lamp used for applications other than in-vehicle applications.

A target on which the "drawing light distribution pattern" is formed is typically a lamp front road surface, but, e.g., a wall surface arranged in the lamp front or a wall surface extending to the lamp front can also be employed.

A specific arrangement of the "light shielding plate" is not particularly limited as long as the light shielding plate is configured to shield part of light from the light emitting element to the projection lens between the light emitting element and the projection lens.

Specific position and area of the "required region" are not particularly limited, and for example, a region including the optical axis of the projection lens can be employed.

A specific opening shape of the "opening" is not particularly limited.

A specific shape of the "inner peripheral surface of the opening" is not particularly limited as long as the inner peripheral surface has such a surface shape that light emitted from the light emitting center of the light emitting element does not enter the projection lens.

Effects of Invention

The drawing lamp according to the invention of the present application is configured to form the drawing light distribution pattern by emitting light from the light emitting element to the lamp front through the projection lens. Since the light shielding plate for shielding part of light from the light emitting element to the projection lens is arranged between the light emitting element and the projection lens and the opening penetrating the light shielding plate is formed in the required region of the light shielding plate, the drawing light distribution pattern can be formed as a light distribution pattern corresponding to the opening shape of the opening.

Since the inner peripheral surface of the opening of the light shielding plate has such a surface shape that light emitted from the light emitting center of the light emitting element does not enter the projection lens, it is possible to effectively reduce blurring of the outline shape of the drawing light distribution pattern or occurrence of color unevenness in the outline portion due to light reflection on the inner peripheral surface of the opening. Thus, a clear drawing light distribution pattern can be formed.

As the configuration of the light shielding plate, even in a case where the plate thickness is increased to such an extent that the opening shape of the opening is not easily deformed, it is also possible to effectively reduce blurring of the outline shape of the drawing light distribution pattern or occurrence of color unevenness in the outline portion due to light reflection on the inner peripheral surface of the opening. Thus, it is possible to prevent, in advance, occurrence of, e.g., such failure that the clear drawing light distribution pattern is not formed due to the insufficient rigidity of the light shielding plate.

As described above, according to the invention of the present application, in the drawing lamp configured to form the drawing light distribution pattern, it is possible to achieve a configuration capable of forming a clear drawing light distribution pattern. Thus, it is possible to enhance a function of warning surroundings.

In the above-described configuration, as the configuration of the light shielding plate, if the light shielding plate is arranged along the inclined plane extending in the direction inclined in the lamp front-back direction with respect to the plane perpendicular to the optical axis of the projection lens, the light shielding plate can be easily arranged in a posture corresponding to, e.g., the design of the drawing lamp and the degree of freedom in arrangement thereof can be enhanced. If the opening of the light shielding plate is formed so as to extend in the same direction as the inclination direction of the light shielding plate at the inclination angle smaller than the included angle between the optical axis and the inclined plane, the inner peripheral surface of the opening can easily have such a surface shape that light emitted from the light emitting center of the light emitting element does not enter the projection lens.

In the case of employing such a configuration, if the inner peripheral surface of the opening includes a front inner peripheral surface positioned on the lamp front side and a back inner peripheral surface positioned on the lamp back side in the inclination direction of the light shielding plate, and the back end edge of the front inner peripheral surface and the front end edge of the back inner peripheral surface are positioned on the back focal plane of the projection lens, the outline of the drawing light distribution pattern can be clearer.

Further, as the configuration of the opening, if the front inner peripheral surface is formed so as to expand in the direction perpendicular to the inclination direction of the light shielding plate to the lamp front, and the back inner peripheral surface is formed to expand in the direction perpendicular to the inclination direction of the light shielding plate to the lamp back, light reflected on the front inner peripheral surface and back inner peripheral surface of the opening is much less likely to enter the projection lens. With this configuration, it is possible to more effectively reduce blurring of the outline shape of the drawing light distribution pattern and occurrence of color unevenness in the outline portion.

In addition to the above-described configuration, it is also possible to employ a configuration in which, e.g., black coating is applied to the inner peripheral surface of the opening, and by employing such a configuration, it is possible to much more effectively reduce blurring of the outline shape of the drawing light distribution pattern and occurrence of color unevenness in the outline portion.

In the above-described configuration, as the configuration of the light emitting element, if the light emitting element is arranged such that the light emitting center thereof is positioned on the same side as the front inner peripheral surface of the opening with respect to the optical axis of the projection lens, light emitted from the light emitting element can efficiently enter the opening of the light shielding plate.

DESCRIPTION OF EMBODIMENTS

Embodiments of the invention of the present application will be described hereinafter with reference to the drawings.

Figure 1:
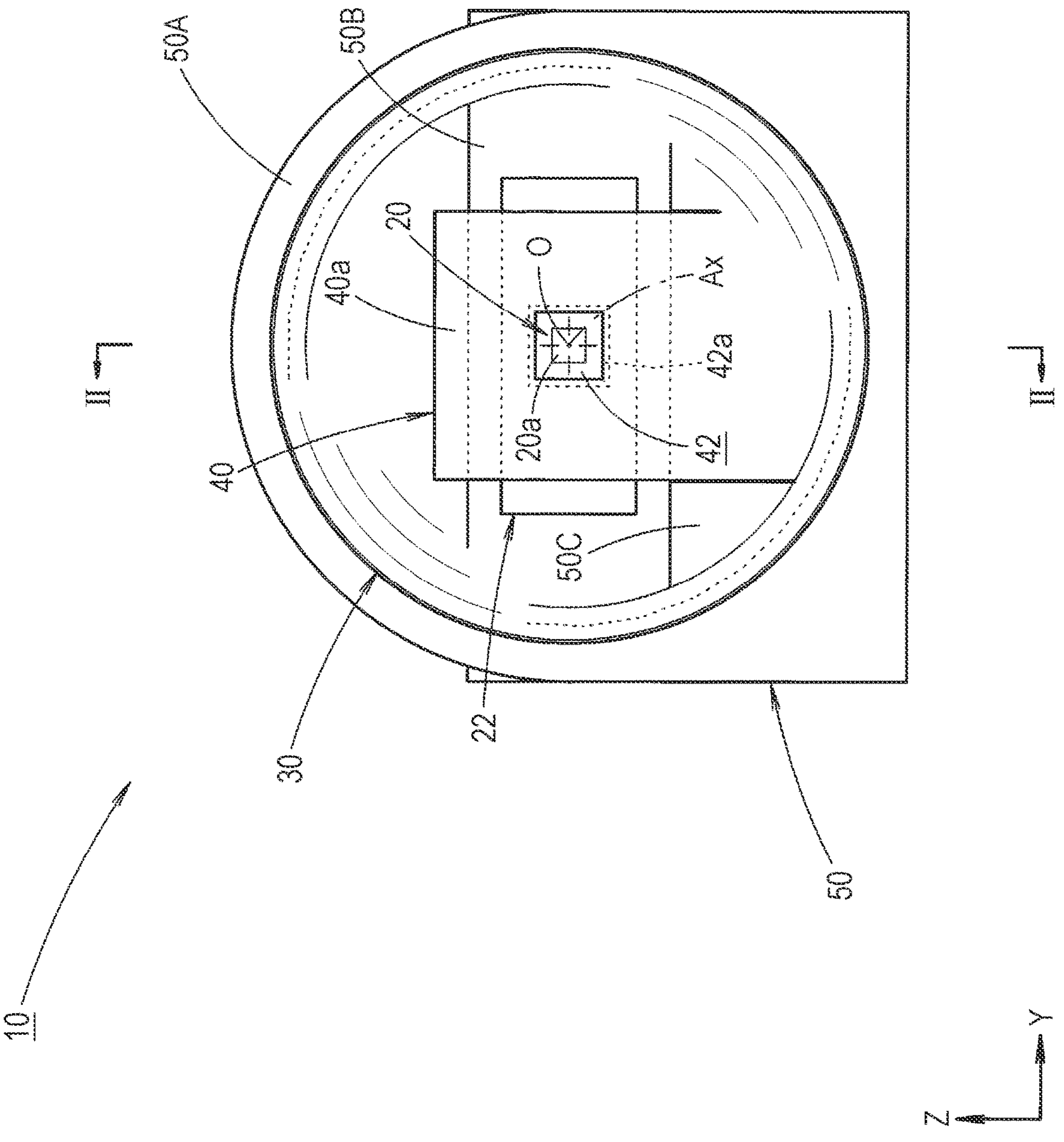
FIG. 1 is a front view illustrating a drawing lamp according to a first embodiment of the invention of the present application.
Figure 2:
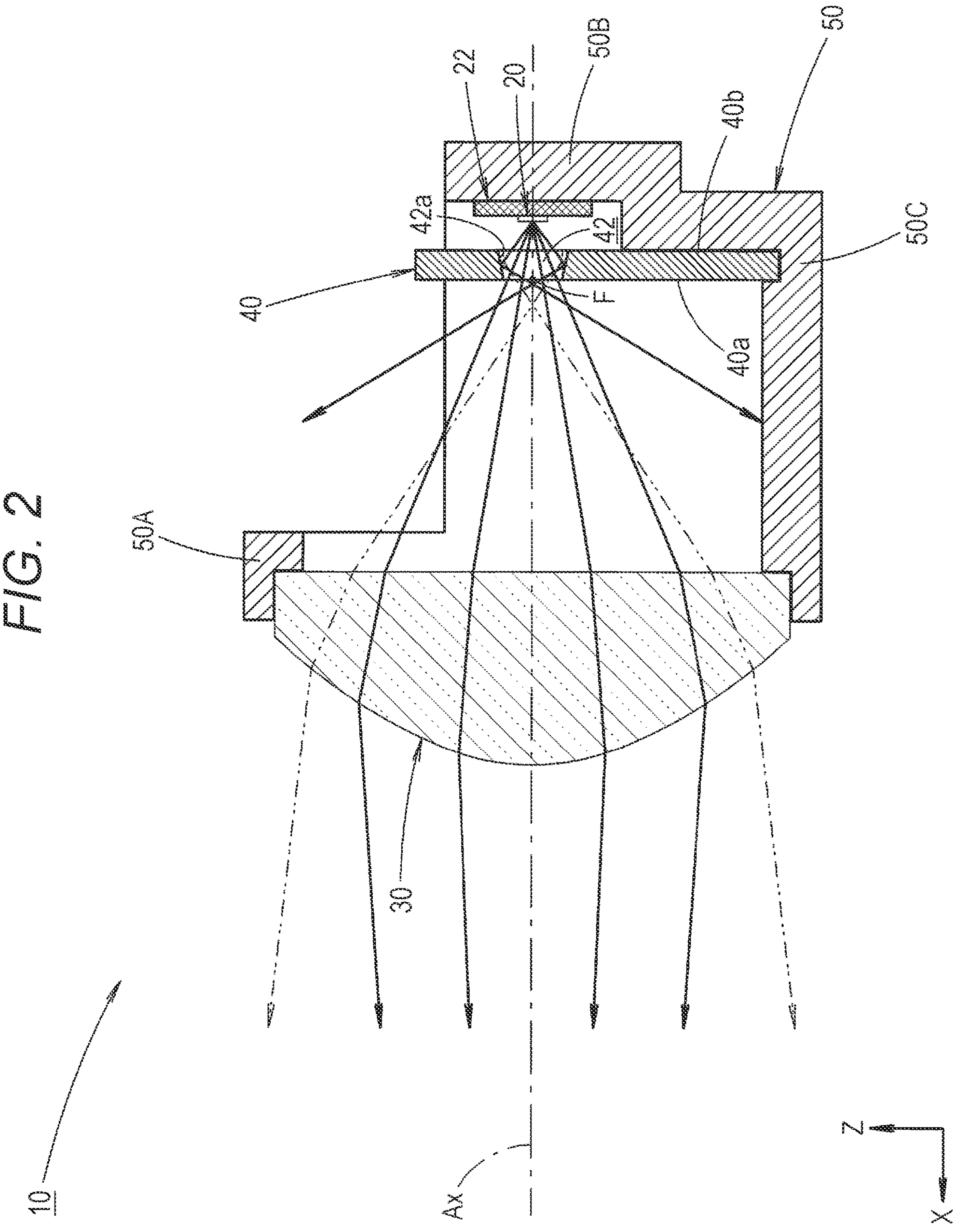
FIG. 2 is a sectional view taken along line II-II of FIG. 1.

FIG. 1 is a front view illustrating a drawing lamp 10 according to a first embodiment of the invention of the present application. FIG. 2 is a sectional view taken along line II-II of FIG. 1, and FIG. 3(*a*) is a detailed view of a main portion of FIG. 2. FIG. 4 is a side view illustrating the drawing lamp 10 mounted on a vehicle 100.

In these figures, a direction represented by X is a "lamp front," a direction represented by Y is a "left direction" ("right direction" in a lamp front view) perpendicular to the "lamp front," and a direction represented by Z is an "up direction." The same applies to figures other than these figures.

As illustrated in FIG. 4, the drawing lamp 10 according to the present embodiment is a drawing lamp mounted on a front end portion of the vehicle 100, and is arranged in a state of the lamp front facing diagonally downward with respect to a vehicle front. The drawing lamp 10 forms a drawing light distribution pattern PA1 (which will be described later) on a vehicle front road surface 2 by light irradiation.

Figure 3:
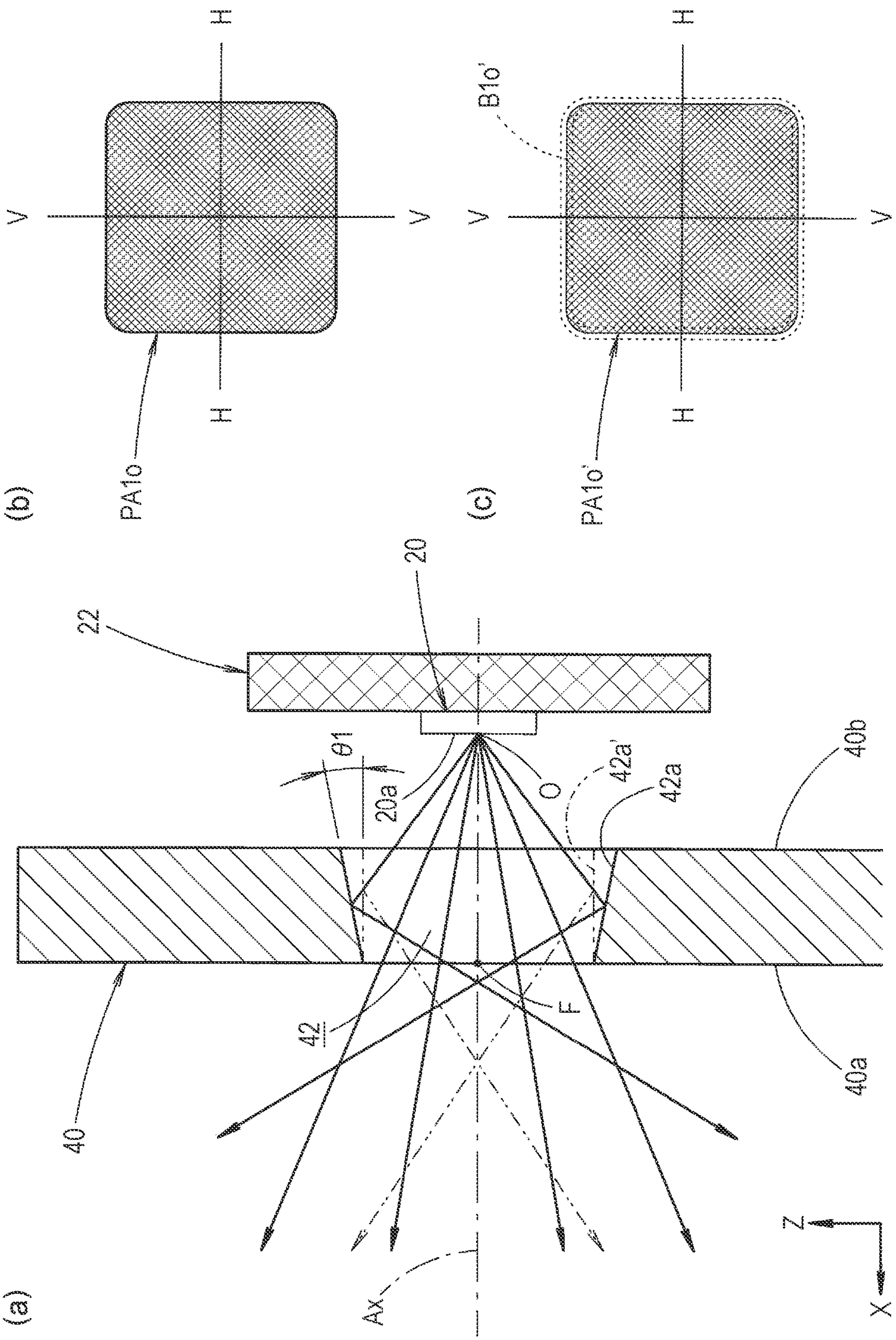
FIG. 3(*a*) is a detailed view of a main portion of FIG. 2, FIG. 3(*b*) is a view illustrating a drawing light distribution pattern formed on a virtual vertical screen arranged in the lamp front by light emitted from the drawing lamp, and FIG. 3(*c*) is a view similar to FIG. 3(*b*), which illustrates a comparative example of the first embodiment.
Figure 4:
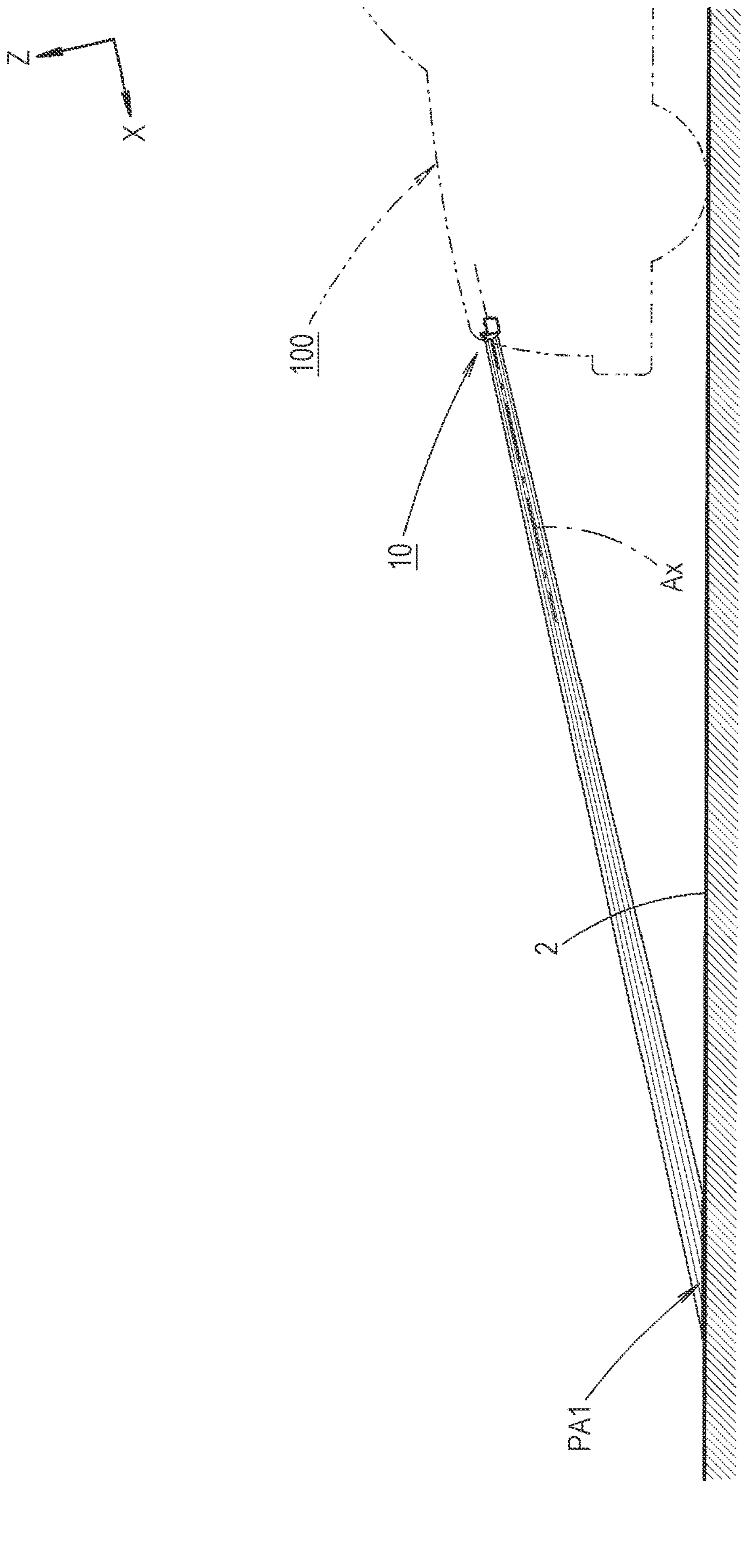
FIG. 4 is a side view illustrating the drawing lamp mounted on a vehicle.

As illustrated in FIGS. 1 to 3(*a*), the drawing lamp 10 is a projector type lamp unit and is configured to emit direct light from a light emitting element 20 to the lamp front through a projection lens 30, and a light shielding plate 40 for shielding part of light from the light emitting element 20 to the projection lens 30 is arranged between the light emitting element 20 and the projection lens 30. Note that FIGS. 1 to 3(*a*) illustrates the drawing lamp 10 in a state of a lamp front-back direction extending in the horizontal direction.

The projection lens 30 has an optical axis Ax extending in the lamp front-back direction, and is configured as a plano-convex aspherical lens of which front surface is formed in a convex curved surface shape. The projection lens 30 has a circular outer shape centered on the optical axis Ax in a lamp front view, and at the outer peripheral edge thereof, is supported by a lens support portion 50A of a base member 50.

The light emitting element 20 is supported by a substrate 22, and the substrate 22 is supported by a light source support portion 50B of the base member 50.

The light emitting element 20 is a white light emitting diode, and has a light emitting surface 20*a* in a rectangular shape (specifically square). The light emitting element 20 is arranged in a state of the light emitting surface 20*a* thereof facing the front of the lamp and its light emitting center (i.e., the center of the light emitting surface 20*a*) O being positioned on the optical axis Ax of the projection lens 30.

The light emitting element 20 is connected to a not-shown electronic control unit, and the electronic control unit performs light ON/OFF control according to, e.g., a vehicle traveling state.

The light shielding plate 40 for shielding part of light from the light emitting element 20 to the projection lens 30 is arranged between the light emitting element 20 and the projection lens 30.

The light shielding plate 40 is formed of a flat plate-shaped member extending along the vertical plane perpendicular to the optical axis Ax, and has a plate thickness of 1 mm or more (e.g., about 2 mm). The light shielding plate 40 is supported by a light shielding plate support portion 50C of the base member 50 in a state in which its front surface 40*a* is arranged at a position on the back focal plane (i.e., vertical plane perpendicular to the optical axis Ax at the back focal point F of the projection lens 30) of the projection lens 30.

An opening 42 penetrating the light shielding plate 40 in the lamp front-back direction is formed in a region of the light shielding plate 40 including the optical axis Ax. The opening 42 has a square opening shape centered on the optical axis Ax in a lamp front view and has an opening shape larger than the light emitting surface 20*a* of the light emitting element 20, and the opening shape thereof is formed so as to gradually increase in size to a lamp back.

That is, as illustrated in FIG. 3(*a*), the center of the opening shape of the opening 42 at the front end edge thereof is positioned at the back focal point F, and the inner peripheral surface 42*a* of the opening 42 is an inclined flat surface on each of the upper, lower, left, and right sides. In this case, the inclination angle of the inner peripheral surface 42*a* with respect to the optical axis Ax is set on each side such that light emitted from the light emitting center O of the light emitting element 20 does not enter the projection lens 30. Specifically, the inclination angle θ1 of the inner peripheral surface 42*a* on each side with respect to the optical axis Ax is set to a value of about 01=10 to 30° (e.g., about 15°).

The light emitting element 20 is arranged at a position relatively close to the light shielding plate 40. Specifically, a positional relationship between the light emitting element 20 and the light shielding plate 40 is set such that a distance between the light emitting surface 20*a* and the back surface 40*b* of the light shielding plate 40 is about 0.5 to 2 times the plate thickness of the light shielding plate 40 (e.g., about the same as the plate thickness of the light shielding plate 40).

The base member 50 has such a configuration that the lens support portion 50A, the light source support portion 50B, and the light shielding plate support portion 50C are integrally formed. Note that the base member 50 is formed of a metal member and functions as a heat sink that dissipates heat generated in the light emitting element 20.

As illustrated in FIG. 2, in the drawing lamp 10 according to the present embodiment, most of direct light emitted from the light emitting element 20 enters the opening 42 of the light shielding plate 40, and light having passed through the opening 42 is emitted to the lamp front through the projection lens 30.

At this time, since the front surface 40*a* of the light shielding plate 40 is positioned on the back focal plane of the projection lens 30, a light distribution pattern having an outer shape corresponding to the opening shape of the opening 42 at the front end edge thereof is formed as an inverted projection image formed by the projection lens 30 on an irradiation target surface in the lamp front.

FIG. 3(*b*) is a view illustrating a drawing light distribution pattern PA1*o* formed on a virtual vertical screen by light emitted from the drawing lamp 10 in a case where the irradiation target surface in the lamp front is the virtual vertical screen arranged along the vertical plane perpendicular to the optical axis Ax.

As illustrated in FIG. 3(*b*), the drawing light distribution pattern PA1*o* is formed as a substantially square light distribution pattern centered on H-V which is a point intersecting the optical axis Ax on the virtual vertical screen.

On the other hand, FIG. 3(*c*) is a view illustrating a drawing light distribution pattern PA1*o*' formed on the virtual vertical screen in a case where the inner peripheral surface 42*a*' of the opening 42 of the light shielding plate 40 is a flat surface extending parallel with the optical axis Ax on each of the upper, lower, left, and right sides as indicated by a two-dot chain line in FIG. 3(*a*).

As illustrated in FIG. 3(*c*), as in the drawing light distribution pattern PA1*o*, the drawing light distribution pattern PA1*o*' is also formed as a substantially square light distribution pattern centered on H-V on the virtual vertical screen, but color unevenness B1*o*' is caused in an outline portion.

This is because part of light emitted from the light emitting element 20 and having entered the opening 42 of the light shielding plate 40 is reflected on the inner peripheral surface 42*a*' of the opening 42 and emitted to the lamp front side as indicated by a two-dot chain line in FIG. 3(*a*), such emitted light enters the projection lens 30 as indicated by a two-dot chain line in FIG. 2, and as a result, light with a specific wavelength component (e.g., blue or yellow wavelength component) is emitted to the lamp front.

On the other hand, in the light shielding plate 40 of the present embodiment, the surface shape of the inner peripheral surface 42*a* of the opening 42 is set such that light emitted from the light emitting center O of the light emitting element 20 does not enter the projection lens 30. Thus, as indicated by a solid line in FIG. 3(*a*), part of light emitted from the light emitting element 20 and having entered the opening 42 of the light shielding plate 40 is reflected on the inner peripheral surface 42*a* and emitted to the lamp front side, but the emission direction thereof is a direction greatly inclined with respect to the optical axis Ax. Thus, the emitted light does not enter the projection lens 30 as indicated by a solid line in FIG. 2, and therefore, light with a specific wavelength component is not emitted to the lamp front.

Note that since the light emitting surface 20*a* of the light emitting element 20 has a certain size, part of light reflected on the inner peripheral surface 42*a* of the opening 42 may enter the projection lens 30, but the amount thereof is slight. Thus, in the drawing light distribution pattern PA1*o* illustrated in FIG. 3(*b*), visible color unevenness is not caused in the outline portion.

In addition, since the front surface 40*a* of the light shielding plate 40 is positioned on the back focal plane of the projection lens 30, the drawing light distribution pattern PA1*o* is formed as a light distribution pattern formed with no blurring and having an outline shape corresponding to the opening shape of the opening 42 at the front end edge thereof.

Figure 5:
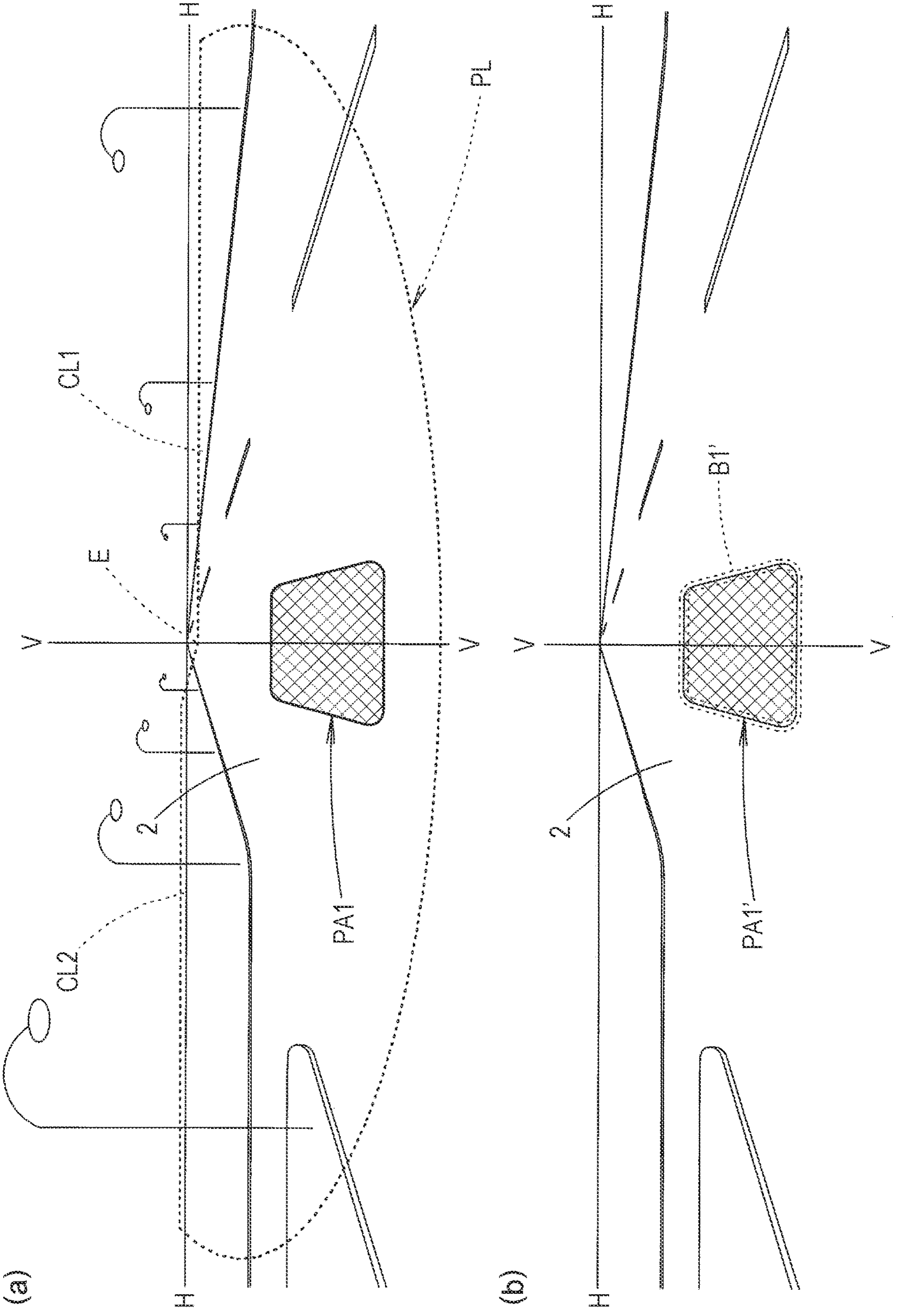
FIG. 5(*a*) is a perspective view illustrating a drawing light distribution pattern formed on a lamp front road surface by light emitted from the drawing lamp, and FIG. 5(*b*) is a view similar to FIG. 5(*a*), which illustrates the comparative example.

FIG. 5(*a*) is a perspective view illustrating the drawing light distribution pattern PA1 formed on the vehicle front road surface 2 by light emitted from the drawing lamp 10 mounted on the vehicle 100 as illustrated in FIG. 4.

The road surface drawing light distribution pattern PA1 is formed together with (or independently of) a low beam light distribution pattern PL formed by light emitted from not-shown other vehicle lamps.

Before description of the drawing light distribution pattern PA1, the low beam light distribution pattern PL will be described.

The low beam light distribution pattern PL is a low beam light distribution pattern of left light distribution, and has cut-off lines CL1, CL2 at the upper end edge thereof.

The cut-off lines CL1, CL2 extend in the horizontal direction at different heights on the left and right sides across a line V-V passing in the vertical direction through H-V, which is a vanishing point in the lamp front direction. An opposite lane portion on the right side of the line V-V is formed as the lower cut-off line CL1, and an own driving lane portion on the left side of the line V-V is formed as the upper cut-off line CL2 stepped up from the lower cut-off line CL1 through an inclined portion.

In the low beam light distribution pattern PL, an elbow point E, which is an intersection point between the lower cut-off line CL1 and the line V-V, is positioned approximately 0.5 to 0.6° below H-V.

The drawing light distribution pattern PA1 is a light distribution pattern for drawing, e.g., a figure for warning surroundings, and is formed in a region closer to the near side with respect to the low beam light distribution pattern PL on the vehicle front road surface 2.

By forming such a drawing light distribution pattern PA1 during traveling of the vehicle at night, for example, it is possible to notify the surroundings that an own vehicle is approaching an intersection in the vehicle front and to warn the surroundings.

The drawing light distribution pattern PA1 is obtained by projecting the drawing light distribution pattern PA1*o* illustrated in FIG. 3(*b*) onto the vehicle front road surface 2, and has a substantially square outer shape. Since the light emitting element 20 is the white light emitting diode, the drawing light distribution pattern PA1 is formed as a white light distribution pattern. However, since color unevenness is not caused in the outline portion of the drawing light distribution pattern PA1*o* illustrated in FIG. 3(*b*), color unevenness is not caused also in the outline portion of the drawing light distribution pattern PA1.

On the other hand, a drawing light distribution pattern PA1' illustrated in FIG. 5(*b*) is obtained by projecting the drawing light distribution pattern PA1*o*' illustrated in FIG. 3(*c*) onto the vehicle front road surface 2.

Although the drawing light distribution pattern PA1' is also formed as a white light distribution pattern, the color unevenness B1*o*' is caused in the outline portion of the drawing light distribution pattern PA1*o*' illustrated in FIG. 3(*b*), and for this reason, color unevenness B1' is caused also in the outline portion of the drawing light distribution pattern PA1' and is visible in, e.g., the color of blue or yellow.

Next, the features of the embodiment will be described.

The drawing lamp 10 according to the present embodiment is configured to form the drawing light distribution pattern PA1 by emitting light from the light emitting element 20 to the lamp front through the projection lens 30. Since the light shielding plate 40 for shielding part of light from the light emitting element 20 to the projection lens 30 is arranged between the light emitting element 20 and the projection lens 30 and the opening 42 penetrating the light shielding plate 40 is formed in a required region (specifically region including the optical axis Ax of the projection lens 30) of the light shielding plate 40, the drawing light distribution pattern PA1 can be formed as a light distribution pattern corresponding to the opening shape of the opening 42.

In this configuration, since the front surface 40*a* of the light shielding plate 40 is positioned on the back focal plane of the projection lens 30, the outline shape of the drawing light distribution pattern PA1 is not blurred. In addition, since the inner peripheral surface 42*a* of the opening 42 of the light shielding plate 40 has such a surface shape that light emitted from the light emitting center O of the light emitting element 20 does not enter the projection lens 30, it is possible to effectively reduce occurrence of color unevenness in the outline portion of the drawing light distribution pattern PA1 due to light reflection on the inner peripheral surface 42*a*. Thus, the clear drawing light distribution pattern PA1 can be formed.

As a result, as the configuration of the light shielding plate 40, even in a case where the plate thickness is increased to such an extent that the opening shape of the opening 42 is not easily deformed (e.g., in a case where the plate thickness is 1 mm or more as in the present embodiment), it is also possible to effectively reduce occurrence of color unevenness in the outline portion of the drawing light distribution pattern PA1 due to light reflection on the inner peripheral surface 42*a* of the opening 42. Thus, it is possible to prevent, in advance, occurrence of, e.g., such failure that the clear drawing light distribution pattern PA1 is not formed due to the insufficient rigidity of the light shielding plate 40.

As described above, according to the present embodiment, in the drawing lamp 10 configured to form the drawing light distribution pattern PA1, it is possible to achieve a configuration capable of forming the clear drawing light distribution pattern PA1. Thus, it is possible to enhance a function of warning surroundings.

In the first embodiment, it has been described that the inclination angle of the inner peripheral surface 42*a* of the opening 42 is set to the same value among each of the upper, lower, left, and right sides. However, it may be configured such that the inclination angle is set to different values.

In the first embodiment, it has been described that the inner peripheral surface 42*a* of the opening 42 is the inclined flat surface on each of the upper, lower, left, and right sides, but the inner peripheral surface 42*a* may be, e.g., an inclined curved surface.

In the first embodiment, it has been described that the opening 42 has the square opening shape centered on the optical axis Ax in a lamp front view, but a configuration having an opening shape other than above may be employed.

In the first embodiment, it has been described that the drawing light distribution pattern PA1 is formed on the vehicle front road surface 2 by light emitted from the drawing lamp 10. However, it may be configured such that the drawing light distribution pattern PA1*o* (see FIG. 3(*b*)) is formed on, e.g., a wall surface arranged in the lamp front or a wall surface extending to the lamp front.

In the first embodiment, it has been described that the drawing lamp 10 is provided at the front end portion of the vehicle 100. However, it may be configured such that the drawing lamp 10 is provided at, e.g., a back end portion or a side portion of the vehicle 100.

Next, modifications of the first embodiment will be described.

First, a first modification of the first embodiment will be described.

Figure 6:
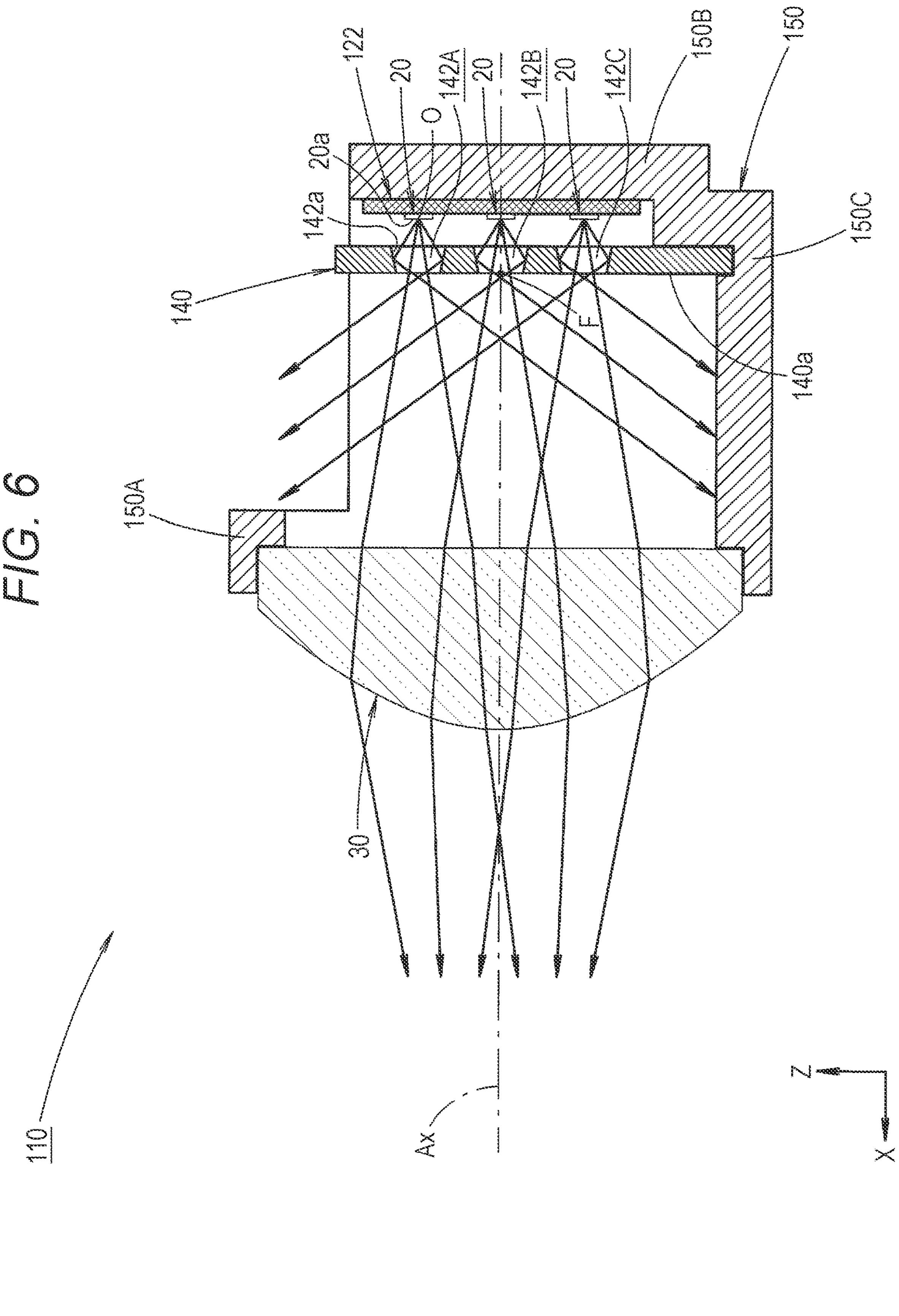
FIG. 6 is a view similar to FIG. 2, which illustrates a first modification of the first embodiment.

FIG. 6 is a view similar to FIG. 2, which illustrates a drawing lamp 110 according to the present modification.

A basic configuration of the present modification is similar to that of the first embodiment, but the number of light emitting elements 20 and the configuration of a light shielding plate 140 are different from those of the first embodiment, and accordingly, the configurations of a substrate 122 and a base member 150 are also partially different from those of the first embodiment.

That is, in the present modification, three light emitting elements 20 are arranged at equal intervals on the optical axis Ax of the projection lens 30 and on both upper and lower sides thereof. In this configuration, each light emitting element 20 is supported by the common substrate 122 in a state of the light emitting surface 20*a* thereof facing the front of the lamp.

As in the light shielding plate 40 of the first embodiment, the light shielding plate 140 of the present modification is formed of a flat plate-shaped member extending along the vertical plane perpendicular to the optical axis Ax of the projection lens 30, and is arranged such that the front surface 140*a* thereof is positioned on the back focal plane of the projection lens 30. The light shielding plate 140 is formed to have the same thickness as that of the light shielding plate 40 of the first embodiment, and three openings 142A, 142B, 142C are formed at positions corresponding to the three light emitting elements 20.

Each of the openings 142A to 142C has a square opening shape slightly smaller than the opening 42 of the first embodiment in a lamp front view, and is formed such that the opening shape gradually increases in size to the lamp back.

That is, the center of the opening shape of the center opening 142B at the front end edge thereof is positioned at the back focal point F, and the inner peripheral surface 142*a* of the opening 142B is an inclined flat surface on each of the upper, lower, left, and right sides. The centers of the opening shapes of both upper and lower openings 142A, 142C at the front end edges thereof are positioned immediately above and below the back focal point F, and the inner peripheral surfaces 142*a* of the openings 142A, 142C are inclined flat surfaces on each of the upper, lower, left, and right sides.

In this case, as in the case of the first embodiment, the inclination angle of the inner peripheral surface 142*a* of each of the openings 142A to 142C with respect to the optical axis Ax is set on each side such that light emitted from the light emitting center O of each light emitting element 20 does not enter the projection lens 30 even after having reflected.

Note that the base member 150 of the present modification also includes a lens support portion 150A that supports the projection lens 30, a light source support portion 150B that supports the substrate 122, and a light shielding plate support portion 150C that supports the light shielding plate 140.

Figure 7:
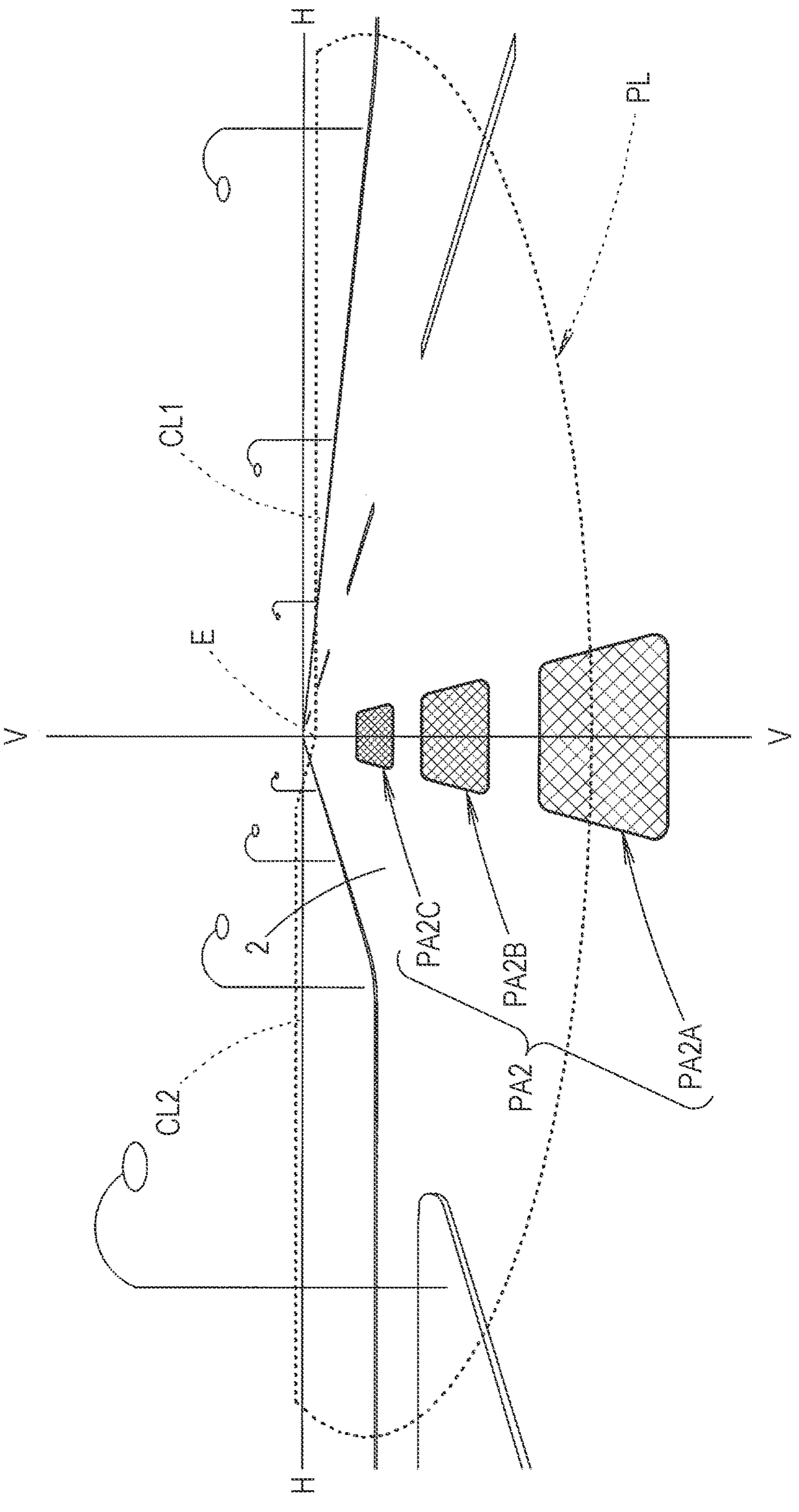
FIG. 7 is a view similar to FIG. 5(*a*), which illustrates the features of the first modification.

FIG. 7 is a perspective view illustrating a drawing light distribution pattern PA2 formed on the vehicle front road surface 2 by light emitted from the drawing lamp 110 in an in-vehicle state together with the low beam light distribution pattern PL.

The drawing light distribution pattern PA2 includes three light distribution patterns PA2A, PA2B, PA2C formed by light emitted from the three light emitting elements 20 and having passed through the three openings 142A, 142B, 142C, and these patterns are formed in series at equal intervals in this order from the near side on the vehicle front road surface 2.

In this configuration, all the three light distribution patterns PA2A to PA2C are formed as white light distribution patterns having a substantially square outer shape, but the outline shape is not blurred or color unevenness is not caused in the outline portion. This is because the front surface 140*a* of the light shielding plate 140 is positioned on the back focal plane of the projection lens 30, and the inner peripheral surface 142*a* of each of the openings 142A to 142C is formed at such an inclination angle that light emitted from the light emitting center O of each light emitting element 20 does not enter the projection lens 30 as reflected light.

Even in a case where the configuration of the present modification is employed, it is possible to obtain the same features and effects as those in the case of the first embodiment.

Moreover, in the present modification, since the three light distribution patterns PA2A to PA2C are formed in series as the drawing light distribution pattern PA2 on the vehicle front road surface 2, the function of warning the surroundings can be further enhanced.

Next, a second modification of the first embodiment will be described.

Figure 8:
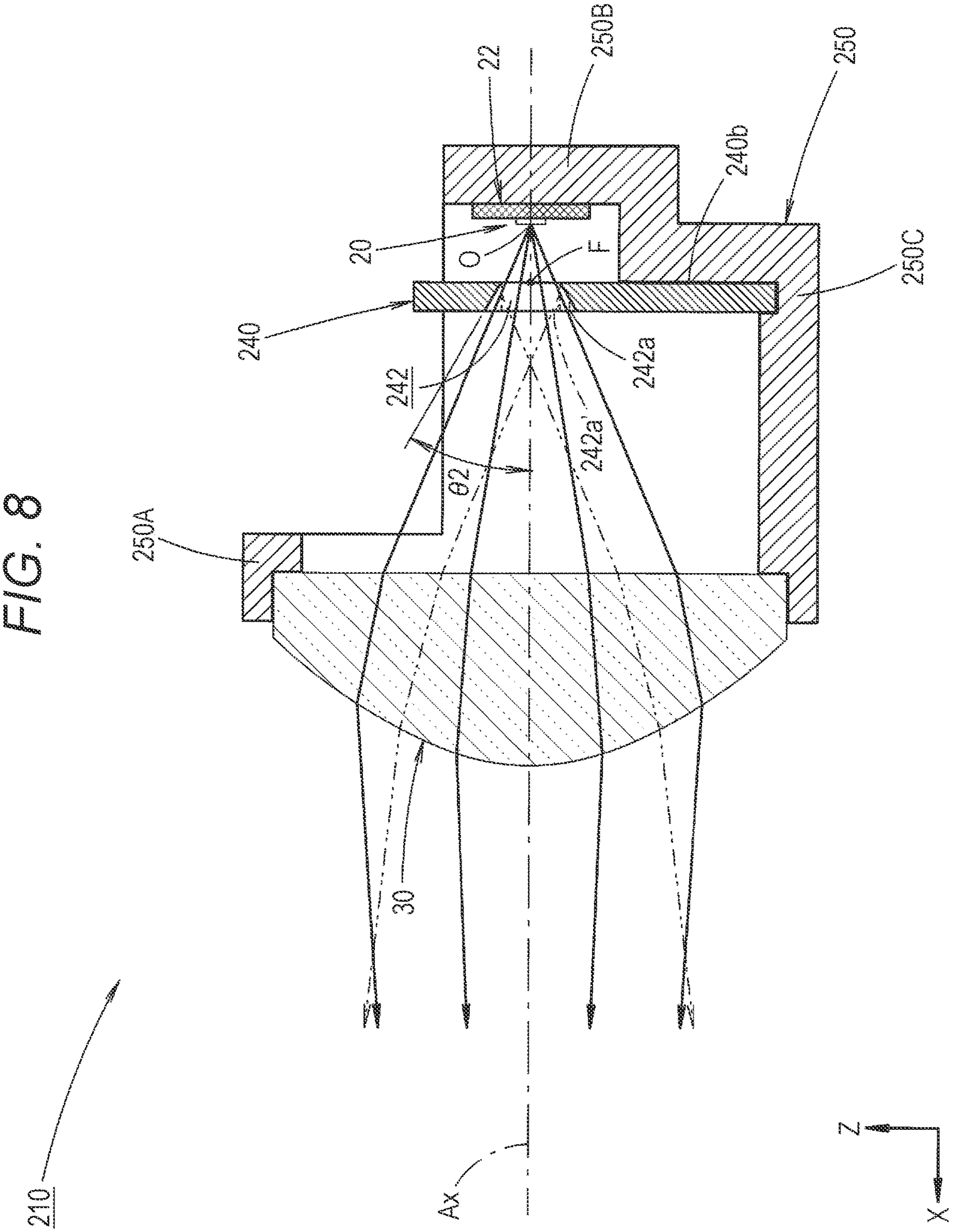
FIG. 8 is a view similar to FIG. 2, which illustrates a second modification of the first embodiment.

FIG. 8 is a view similar to FIG. 2, which illustrates a drawing lamp 210 according to the present modification.

A basic configuration of the present modification is similar to that of the first embodiment, but the configuration and arrangement of a light shielding plate 240 are different from those of the first embodiment, and accordingly, the configuration of a base member 250 is also partially different from that of the first embodiment.

That is, the light shielding plate 240 of the present modification is also formed of a flat plate-shaped member extending along the vertical plane perpendicular to the optical axis Ax of the projection lens 30, but is different from that in the case of the first embodiment in that the light shielding plate 240 is arranged such that the back surface 240*b* thereof is positioned on the back focal plane of the projection lens 30.

The light shielding plate 240 is formed to have the same plate thickness as that of the light shielding plate 40 of the first embodiment, and an opening 242 penetrating the light shielding plate 240 in the lamp front-back direction is formed in a region including the optical axis Ax. The opening 242 has a square opening shape centered on the optical axis Ax in a lamp front view and has an opening shape larger than the light emitting surface 20*a* of the light emitting element 20, and the opening shape thereof is formed so as to gradually increase in size to the lamp front.

That is, the center of the opening shape of the opening 242 at the back end edge thereof is positioned at the back focal point F, and the inner peripheral surface 242*a* of the opening 242 is an inclined flat surface on each of the upper, lower, left, and right sides. In this case, the inclination angle with respect to the optical axis Ax is set on each side such that light emitted from the light emitting center O of the light emitting element 20 does not enter the projection lens 30. Specifically, the inclination angle θ2 of the inner peripheral surface 242*a* on each side with respect to the optical axis Ax is set to a value of about θ2=20 to 60° (e.g., about 30°).

As in the case of the first embodiment, the light emitting element 20 is arranged in a state of the light emitting surface 20*a* thereof facing the front of the lamp and the light emitting center O thereof being positioned on the optical axis Ax of the projection lens 30, but is arranged at a position farther to the lamp back side from the light shielding plate 240 by the plate thickness thereof as compared to the case of the first embodiment.

Note that the base member 250 of the present modification also includes a lens support portion 250A that supports the projection lens 30, a light source support portion 250B that supports the substrate 22, and a light shielding plate support portion 250C that supports the light shielding plate 240.

Figure 9:
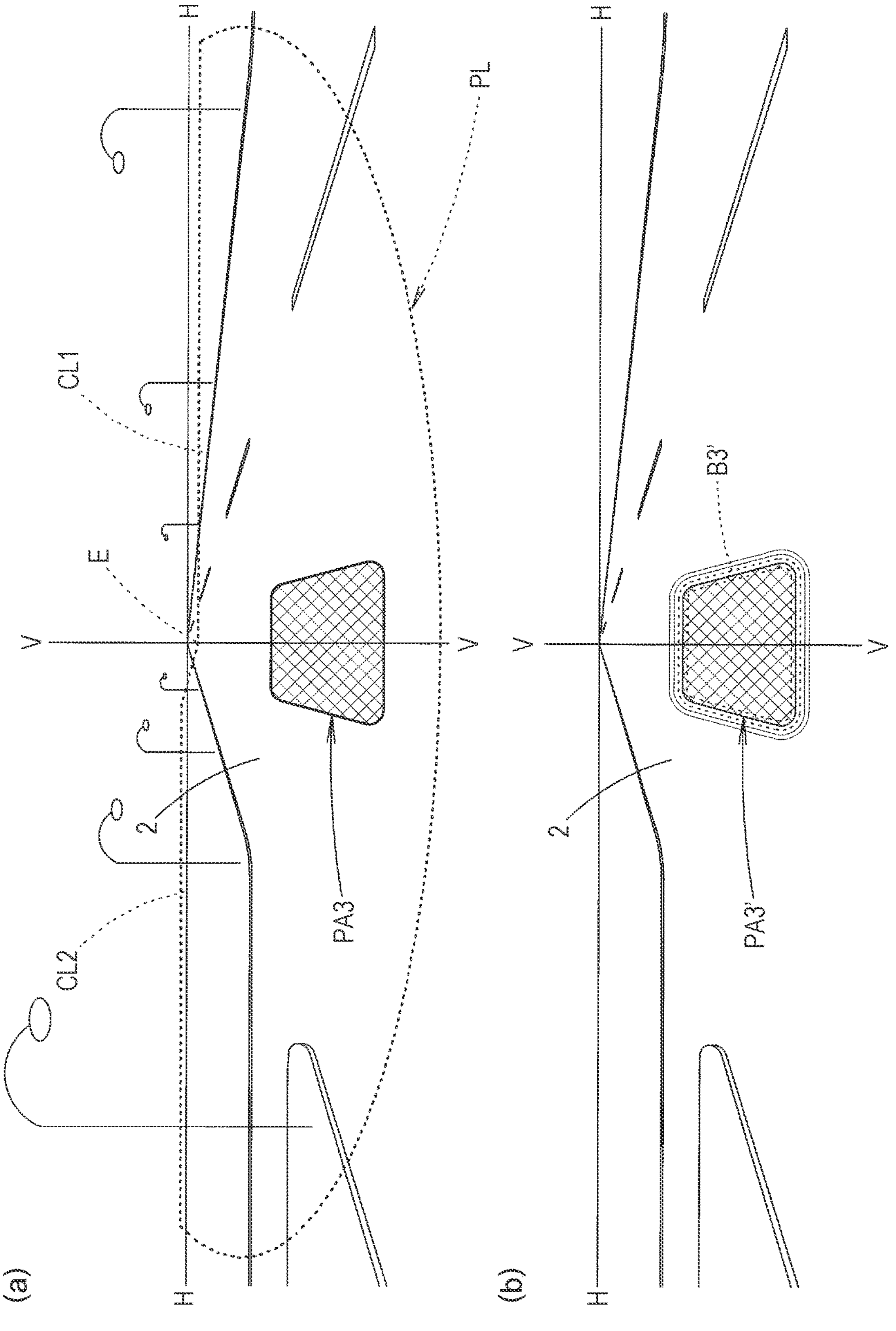
FIG. 9 is a view similar to FIG. 5, which illustrates the features of the second modification together with a comparative example.

FIG. 9(*a*) is a perspective view illustrating a drawing light distribution pattern PA3 formed on the vehicle front road surface 2 by light emitted from the drawing lamp 210 in an in-vehicle state together with the low beam light distribution pattern PL.

The drawing light distribution pattern PA3 is formed as a white light distribution pattern having a substantially square outer shape, but the outline shape is not blurred or color unevenness is not caused in the outline portion. This is because the inner peripheral surface 242*a* of the opening 242 is formed at such an inclination angle that light emitted from the light emitting center O of the light emitting element 20 does not enter the projection lens 30 as reflected light.

On the other hand, FIG. 9(*b*) is a view illustrating a drawing light distribution pattern PA3' formed on the vehicle front road surface 2 in a case where the inner peripheral surface 242*a*' of the opening 242 of the light shielding plate 240 is a flat surface extending parallel with the optical axis Ax on each of the upper, lower, left, and right sides as indicated by a two-dot chain line in FIG. 8.

The drawing light distribution pattern PA3' is also formed as a white light distribution pattern. However, the outline shape is blurred, and color unevenness B3' is caused in the outline portion and is visible in the color of, e.g., blue or yellow.

The outline shape of the drawing light distribution pattern PA3' is blurred because the back surface 240*b* of the light shielding plate 240 of the present modification is positioned on the back focal plane of the projection lens 30 and light reflected on the inner peripheral surface 242*a*' of the opening 242 positioned on the lamp front side with respect to the back focal plane and emitted to the lamp front from the projection lens 30 is emitted in a direction beyond the drawing light distribution pattern PA3'.

Even in a case where the configuration of the present modification is employed, it is possible to obtain the same features and effects as those in the case of the first embodiment.

Moreover, in the present modification, although the light shielding plate 240 is configured such that the back surface 240*b* thereof is positioned on the back focal plane of the projection lens 30, blurring of the outline shape of the drawing light distribution pattern PA3 can be effectively reduced and occurrence of color unevenness in the outline portion can be effectively reduced.

Next, a drawing lamp 510 according to a second embodiment of the invention of the present application will be described.

Figure 10:
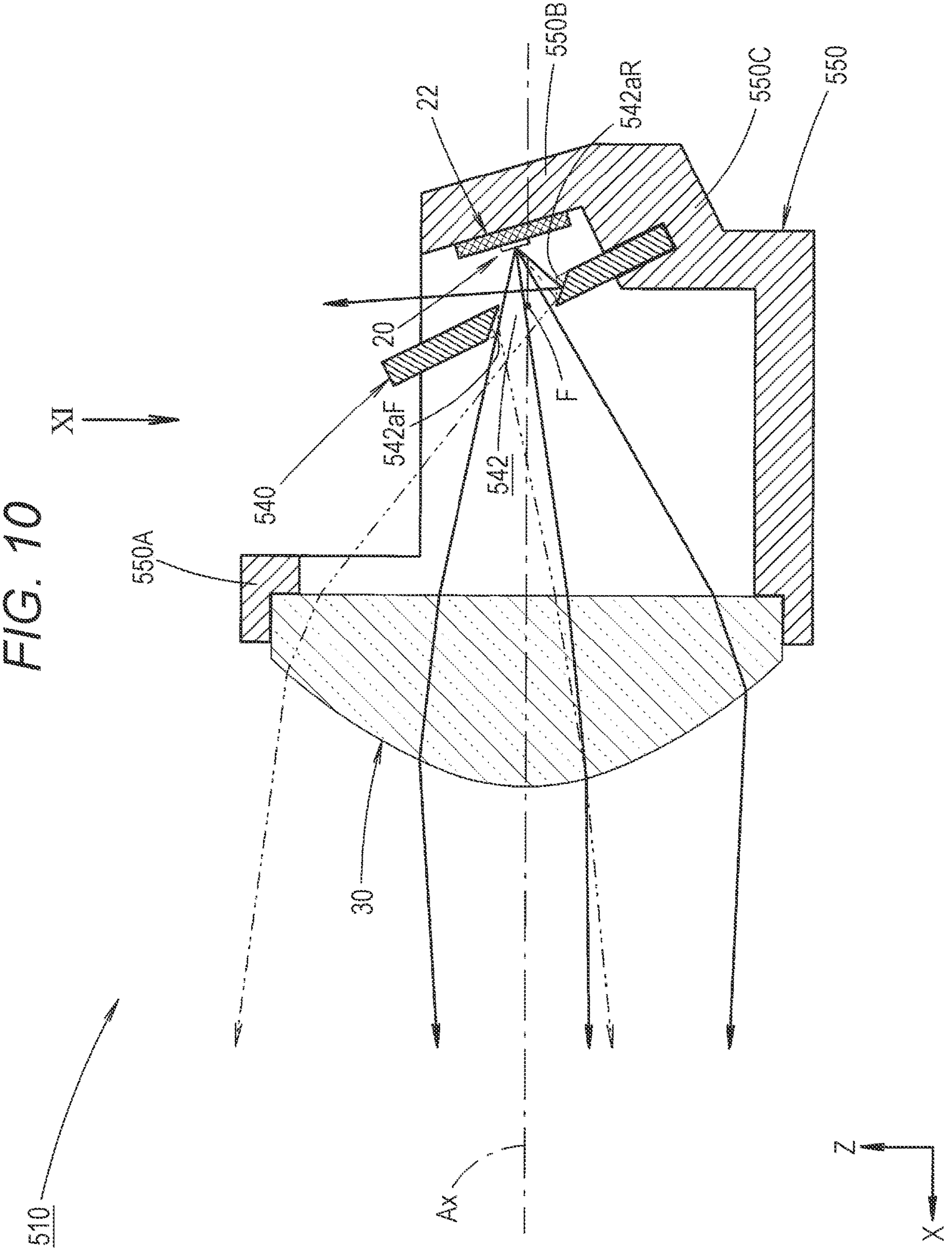
FIG. 10 is a view similar to FIG. 2, which illustrates a drawing lamp according to a second embodiment of the invention of the present application.
Figure 11:
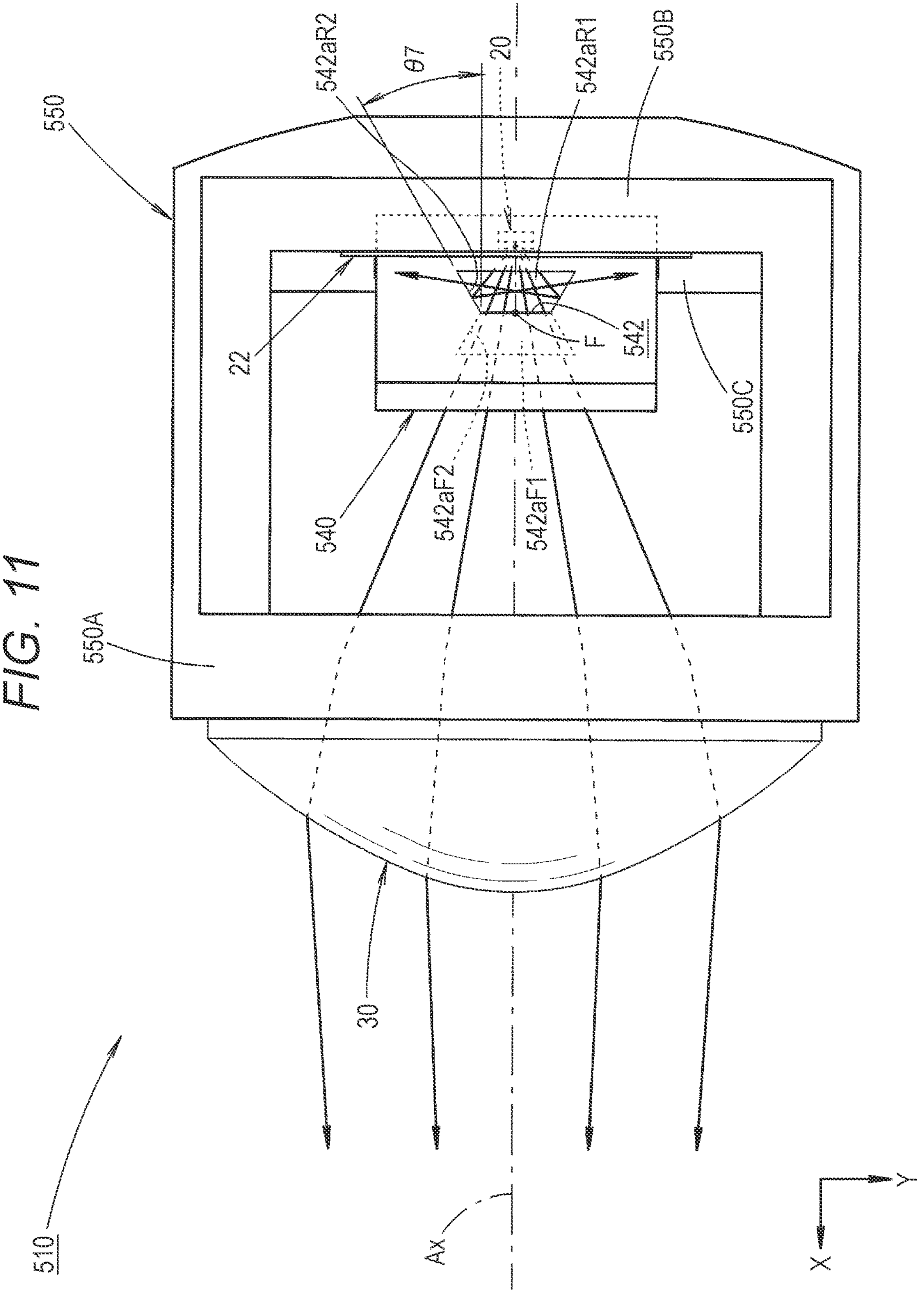
FIG. 11 is a view in the direction of an arrow XI of FIG. 10.

FIG. 10 is a view similar to FIG. 2, which illustrates the drawing lamp 510 according to the present embodiment. Moreover, FIG. 11 is a view in the direction of an arrow XI of FIG. 10. Further, FIG. 12(*a*) is a detailed view of a main portion of FIG. 10, and FIG. 12(*b*) is a view in the direction of an arrow b of FIG. 12(*a*).

Figure 12:
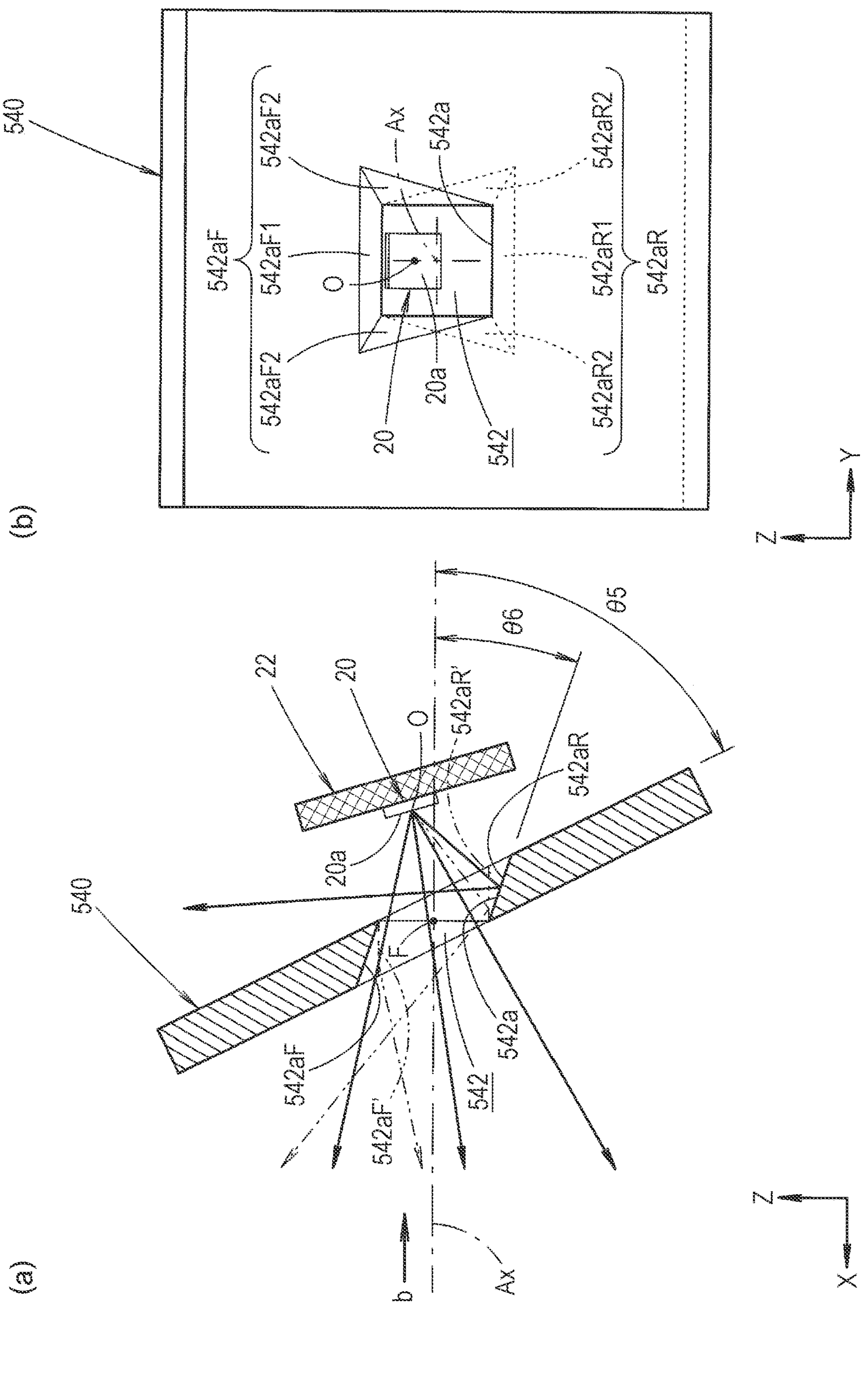
FIG. 12(*a*) is a detailed view of a main portion of FIG. 10, and FIG. 12(*b*) is a view in the direction of an arrow b of FIG. 12(*a*).

As illustrated in FIGS. 10 to 12, a basic configuration of the drawing lamp 510 according to the present embodiment is similar to that of the first embodiment, but the configuration and arrangement of a light shielding plate 540 and the arrangements of a light emitting element 20 and a substrate 22 are different from those of the first embodiment, and accordingly, the configuration of a base member 550 is also partially different from that of the first embodiment.

That is, the light shielding plate 540 of the present embodiment is formed of a flat plate-shaped member extending in a direction inclined in the lamp front-back direction with respect to the vertical plane perpendicular to the optical axis Ax of a projection lens 30.

Specifically, the light shielding plate 540 is arranged so as to pass through the back focal point F of the projection lens 30 along an inclined plane extending in a direction inclined forward with respect to the vertical plane. In this configuration, the included angle θ5 between the optical axis Ax and the inclined plane is set to a value of about θ5=40 to 70°.

In the present embodiment, an opening 542 penetrating the light shielding plate 540 in the lamp front-back direction is also formed in a region of the light shielding plate 540 including the optical axis Ax. The opening 542 is formed to extend in the same direction as the inclination direction of the light shielding plate 540 at an inclination angle θ6 smaller than the included angle θ5 between the optical axis Ax and the inclined plane. Specifically, the inclination angle θ6 is set to a value of about θ6=20 to 40°.

The opening 542 is set to such a square shape that an opening shape on the back focal plane of the projection lens 30 is larger than a light emitting surface 20*a* of the light emitting element 20 centered on the optical axis Ax in a lamp front view. The opening 542 is formed such that the opening shape thereof gradually increases in size to the lamp front and the lamp back (this will be described later).

In the present embodiment, the light emitting element 20 is also arranged at a position relatively close to the light shielding plate 540. Specifically, the light emitting element 20 is arranged in the vicinity of the upper side of the optical axis Ax in a state of the light emitting surface 20*a* facing slightly downward with respect to the front of the lamp (i.e., in a state of the light emitting surface facing the substantially center of the opening 542), and the light emitting center O thereof is positioned immediately above the optical axis Ax.

Note that the base member 550 of the present embodiment also includes a lens support portion 550A that supports the projection lens 30, a light source support portion 550B that supports the substrate 22, and a light shielding plate support portion 550C that supports the light shielding plate 540.

As illustrated in FIGS. 11 and 12, in the inner peripheral surface 542*a* of the opening 542, a lower surface region 542*a*R1 of a back inner peripheral surface 542*a*R positioned on the lamp back side with respect to the back focal plane of the projection lens 30 extends at the inclination angle θ6, and side surface regions 542*a*R2 positioned on both left and right sides extend in both left and right directions at an inclination angle θ7 (e.g., a value of about θ7=30 to 50°) slightly greater than the inclination angle θ6. In the inner peripheral surface 542*a*, an upper surface region 542*a*F1 of a front inner peripheral surface 542*a*F positioned on the lamp front side with respect to the back focal plane of the projection lens 30 extends at the inclination angle θ6, and side surface regions 542*a*F2 positioned on both left and right sides extend in both left and right directions at the inclination angle θ7.

With this configuration, in the light shielding plate 540 of the present embodiment, the surface shape of the inner peripheral surface 542*a* of the opening 542 is also set such that light emitted from the light emitting center O of the light emitting element 20 does not enter the projection lens 30.

As indicated by a solid line in FIG. 12(*a*), part of light emitted from the light emitting element 20 and having entered the opening 542 of the light shielding plate 540 is reflected on the back inner peripheral surface 542*a*R of the inner peripheral surface 542*a*, but the emission direction thereof is a direction greatly inclined with respect to the optical axis Ax. Thus, the emitted light does not enter the projection lens 30 as indicated by a solid line in FIGS. 10 and 11, and therefore, light with a specific wavelength component is not emitted to the lamp front.

On the other hand, as indicated by a two-dot chain line in FIG. 12(*a*), in a case where the opening 542 of the light shielding plate 540 is configured such that the front inner peripheral surface 542*a*F' and back inner peripheral surface 542*a*R' of the inner peripheral surface thereof are flat surfaces extending parallel with the optical axis Ax, part of light emitted from the light emitting element 20 and having entered the opening 542 of the light shielding plate 540 is reflected on the front inner peripheral surface 542*a*F' and the back inner peripheral surface 542*a*R' and emitted to the lamp front side, and the emitted light enters the projection lens 30 as indicated by a two-dot chain line in FIG. 10.

Figure 13:
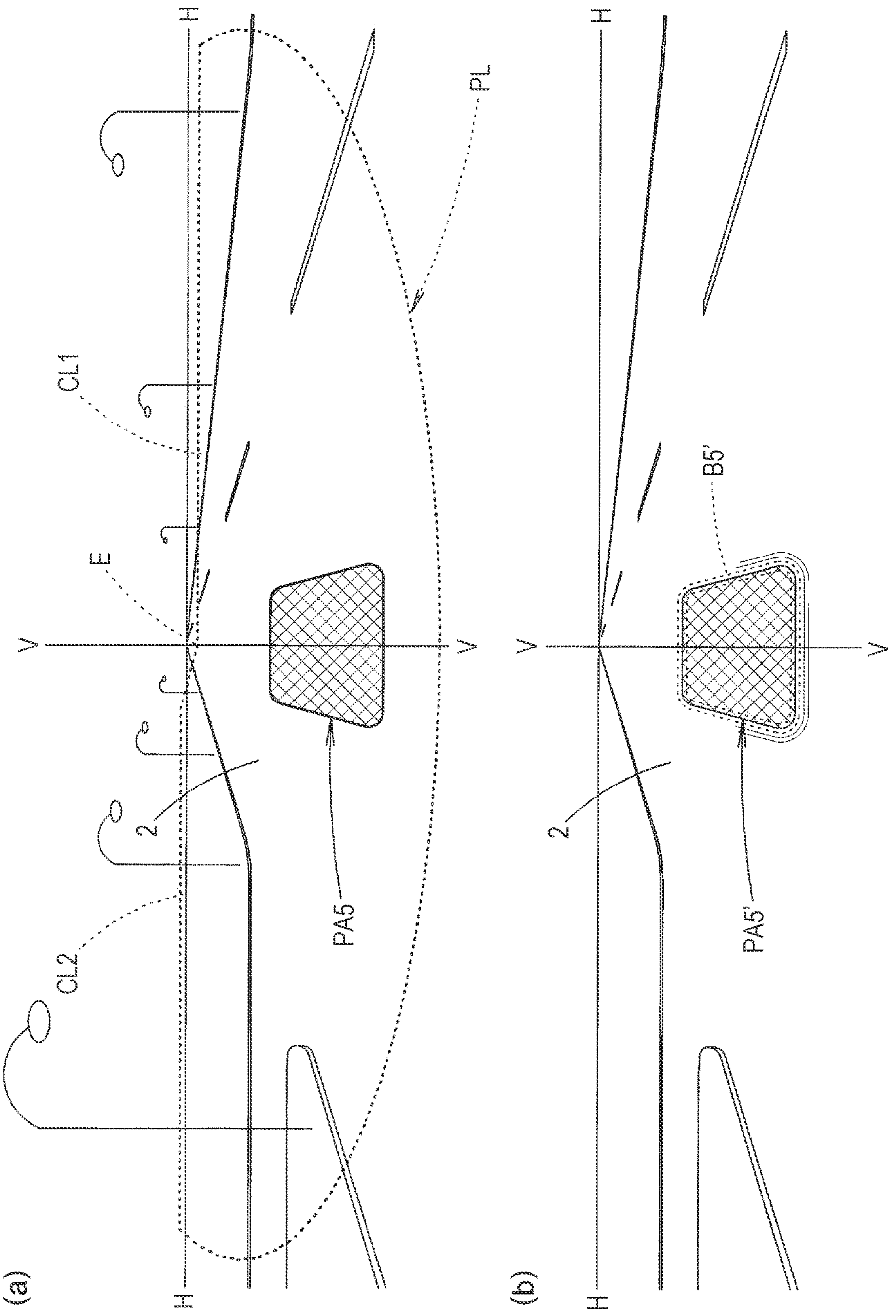
FIG. 13 is a view similar to FIG. 5, which illustrates the features of the second embodiment.

FIG. 13(*a*) is a perspective view illustrating a drawing light distribution pattern PA5 formed on a vehicle front road surface 2 by light emitted from the drawing lamp 510 in an in-vehicle state together with a low beam light distribution pattern PL.

The drawing light distribution pattern PA5 is formed as a white light distribution pattern having a substantially square outer shape, but the outline shape is not blurred or color unevenness is not caused in the outline portion. This is because the inner peripheral surface 542*a* of the opening 542 is formed at such an inclination angle that light emitted from the light emitting center O of the light emitting element 20 does not enter the projection lens 30 as reflected light.

On the other hand, FIG. 13(*b*) is a view illustrating a drawing light distribution pattern PA5' formed on the vehicle front road surface 2 in a case where the front inner peripheral surface 542*a*F' and back inner peripheral surface 542*a*R' of the inner peripheral surface 542*a*' of the opening 542 of the light shielding plate 540 are flat surfaces extending parallel with the optical axis Ax as indicated by a two-dot chain line in FIG. 12(*a*).

The drawing light distribution pattern PA5' is also formed as a white light distribution pattern. However, the outline shape is blurred on the near side, and color unevenness B5' is caused in the outline portion and is visible in the color of, e.g., blue or yellow.

In this configuration, the outline shape of the drawing light distribution pattern PA5' is blurred on the near side because the front inner peripheral surface 542*a*F' of the light shielding plate 540 is positioned on the lamp front side with respect to the back focal plane of the projection lens 30.

Even in a case where the configuration of the present embodiment is employed, it is possible to obtain the same features and effects as those in the case of the first embodiment.

Moreover, in the present embodiment, since the light shielding plate 540 is arranged along the inclined plane extending in the direction inclined in the lamp front-back direction with respect to the vertical plane perpendicular to the optical axis Ax of the projection lens 30, the light shielding plate 540 can be easily arranged in a posture corresponding to, e.g., the design of the drawing lamp 510 and the degree of freedom in arrangement thereof can be enhanced.

Since the opening 542 of the light shielding plate 540 is formed so as to extend in the same direction as the inclination direction of the light shielding plate 540 at the inclination angle θ6 smaller than the included angle θ5 between the optical axis Ax and the inclined plane, the inner peripheral surface 542*a* of the opening 542 can easily have such a surface shape that light emitted from the light emitting center O of the light emitting element 20 does not enter the projection lens 30.

In addition, in the present embodiment, the inner peripheral surface 542*a* of the opening 542 includes the front inner peripheral surface 542*a*F positioned on the lamp front side and the back inner peripheral surface 542*a*R positioned on the lamp back side in the inclination direction of the light shielding plate 540, and the back end edge of the front inner peripheral surface 542*a*F and the front end edge of the back inner peripheral surface 542*a*R are positioned on the back focal plane of the projection lens. Thus, the outline of the drawing light distribution pattern PA5 can be clearer.

Further, in the present embodiment, as the configuration of the opening 542, the pair of left and right side surface regions 542*a*F2 of the front inner peripheral surface 542*a*F is formed so as to expand in the direction (i.e., left-right direction) perpendicular to the inclination direction of the light shielding plate 540 to the lamp front, and the pair of left and right side surface region 542*a*R2 of the back inner peripheral surface 542*a*R is formed to expand in the direction perpendicular to the inclination direction of the light shielding plate 540 to the lamp back. Thus, light reflected on the front inner peripheral surface 542*a*F and back inner peripheral surface 542*a*R of the opening 542 is much less likely to enter the projection lens 30. With this configuration, it is possible to more effectively reduce blurring of the outline shape of the drawing light distribution pattern PA5 and occurrence of color unevenness in the outline portion.

In addition, in the present embodiment, since the light emitting element 20 is arranged such that the light emitting center O is positioned on the same side (i.e., upper side) as the front inner peripheral surface 542*a*F of the opening 542 with respect to the optical axis Ax of the projection lens 30, light emitted from the light emitting element 20 can efficiently enter the opening 542 of the light shielding plate 540.

It is also possible to employ a configuration in which, e.g., black coating is applied to the inner peripheral surface 542*a* of the opening 542 for the light shielding plate 540 of the present embodiment. With this configuration, it is possible to much more effectively reduce blurring of the outline shape of the drawing light distribution pattern PA5 and occurrence of color unevenness in the outline portion.

Note that the numerical values indicated as the specifications in the above-described embodiments and the modifications thereof are merely examples, and naturally these values may be set at different values as necessary.

Moreover, the invention of the present application is not limited to the configurations described in the above-described embodiments and the modifications thereof, and can employ configurations to which various other modifications are added.

The present international application claims priority based on Japanese Patent Application No. 2021-134923 filed on Aug. 20, 2021, and the entire contents of Japanese Patent Application No. 2021-134923, which is Japanese Patent Application of the present international application, are incorporated herein by reference.

The above description of the specific embodiments of the present invention has been presented for the purpose of illustration. The embodiments are not intended to be exhaustive or to limit the invention as it is in the form described. It is obvious to those skilled in the art that many modifications and alterations are possible in light of the contents of the description above.

LIST OF REFERENCE SIGNS

2 Vehicle Front Road Surface
10, 110, 210, 510 Drawing Lamp
20 Light Emitting Element
20*a* Light Emitting Surface
22, 122 Substrate
30 Projection Lens
40, 140, 240, 540 Light Shielding Plate
40*a*, 140*a* Front Surface
40*b*, 240*b* Back Surface
42, 142A, 142B, 142C, 242, 542 Opening
42*a*, 142*a*, 242*a*, 542*a* Inner Peripheral Surface
50, 150, 250 Base Member
50A, 150A, 250A, 550A Lens Support Portion
50B, 150B, 250B, 550B Light Source Support Portion
50C, 150C, 250C, 550C Light Shielding Plate Support Portion
100 Vehicle
542*a*F Front Inner Peripheral Surface
542*a*F1 Upper Surface Region
542*a*F2 Side Surface Region
542*a*R Back Inner Peripheral Surface
542*a*R1 Lower Surface Region
542*a*R2 Side Surface Region
Ax Optical Axis
CL1 Lower Cut-Off Line
CL2 Upper Cut-Off Line
E Elbow Point
F Back Focal Point
O Light Emitting Center
PA1, PA1*o*, PA2, PA3, PA5 Drawing Light Distribution Pattern
PA2A, PA2B, PA2C Light Distribution Pattern
PL Low Beam Light Distribution Pattern
θ1, θ2, θ6, θ7 Inclination Angle
θ5 Included Angle

The invention claimed is:

1. A drawing lamp configured to form a drawing light distribution pattern by emitting light from a light emitting element to a lamp front through a projection lens, wherein
a light shielding plate for shielding part of light from the light emitting element to the projection lens is arranged between the light emitting element and the projection lens,
an opening penetrating the light shielding plate is formed in a required region of the light shielding plate,
an inner peripheral surface of the opening has such a surface shape that light emitted from a light emitting center of the light emitting element does not enter the projection lens,
the light shielding plate is arranged along an inclined plane extending in a direction inclined in a lamp front-back direction with respect to a plane perpendicular to an optical axis of the projection lens, and
the opening is formed so as to extend in a direction identical to an inclination direction of the light shielding plate at an inclination angle smaller than an included angle between the optical axis and the inclined plane.

2. The drawing lamp according to claim 1, wherein
the inner peripheral surface of the opening includes a front inner peripheral surface positioned on a lamp front side and a back inner peripheral surface positioned on a lamp back side in the inclination direction of the light shielding plate, and
a back end edge of the front inner peripheral surface and a front end edge of the back inner peripheral surface are positioned on a back focal plane of the projection lens.

3. The drawing lamp according to claim 2, wherein
the front inner peripheral surface is formed so as to expand in a direction perpendicular to the inclination direction of the light shielding plate to the lamp front, and
the back inner peripheral surface is formed so as to spread in a direction perpendicular to the inclination direction of the light shielding plate to a lamp back.

4. The drawing lamp according to claim 2, wherein the light emitting element is arranged such that the light emitting center thereof is positioned on a side identical to the front inner peripheral surface with respect to the optical axis.

* * * * *